(12) United States Patent
Anandan

(10) Patent No.: US 7,934,862 B2
(45) Date of Patent: May 3, 2011

(54) UV BASED COLOR PIXEL BACKLIGHT FOR LIQUID CRYSTAL DISPLAY

(76) Inventor: Munisamy Anandan, Del Valle, TX (US)

( * ) Notice: Subject to any disclaimer, the term of this patent is extended or adjusted under 35 U.S.C. 154(b) by 463 days.

(21) Appl. No.: 12/220,736

(22) Filed: Jul. 28, 2008

(65) Prior Publication Data

US 2009/0080215 A1    Mar. 26, 2009

Related U.S. Application Data

(60) Provisional application No. 60/995,093, filed on Sep. 24, 2007.

(51) Int. Cl.
*F21V 7/04*    (2006.01)

(52) U.S. Cl. .......... 362/606; 362/84; 362/231; 362/612; 362/613

(58) Field of Classification Search ............... 362/606, 362/612, 613, 616, 617, 619, 84, 231
See application file for complete search history.

(56) References Cited

U.S. PATENT DOCUMENTS

| | | | |
|---|---|---|---|
| 4,978,888 A | 12/1990 | Anandan et al. | |
| 5,396,406 A * | 3/1995 | Ketchpel | 362/27 |
| 6,637,905 B1 * | 10/2003 | Ng et al. | 362/601 |
| 7,036,946 B1 | 5/2006 | Mosier | |
| 7,423,296 B2 * | 9/2008 | Chua | 257/98 |
| 2005/0057145 A1 * | 3/2005 | Shieh et al. | 313/503 |
| 2005/0194604 A1 * | 9/2005 | Sakuma et al. | 257/98 |

OTHER PUBLICATIONS

M.J.J. Jack et. al —"Color Separating backlight for improved LCD efficiency" pp. 175-178, Proceedings of 27th International Display Research Conference Sep. 18-20, 2007, Moscow, Russia.
Yoichi Taira et. al, "Low power LCD using a novel optical system", SID-02 Digest of Technical papers, pp. 1313-1315, 2002.
Jyrki Kimmel et. al, "Diffractive backlight grating array for mobile displays", Proceedings of IDRC 2007, pp. 171-174, Moscow, Sep. 2007.
M. Anandan and D Ketchum, "Present status and future trend of multi-channel hollow cathode true flat fluorescent lamp for full color LCD backlighting", Displays, vol. 15, No. 1, 1994.
N. Ogawa et. al —"Filed sequential color, LCD using organic EL backlighting" SID Digest of Technical Papers SID International Symposium 1999.

* cited by examiner

*Primary Examiner* — John A Ward

(57) ABSTRACT

A ultra-violet based color pixel backlight system for Liquid Crystal Display, that does not contain the traditional color filters, comprising multiplicity of LEDs, emitting UV light in the wavelength range of 250 nm to 390 nm, assembled at one edge of a UV transmitting light guide, which has other three edges and bottom surface coated with UV reflecting layer and its top surface etched with UV extracting pixel patterns that contain phosphors that emit different colors of light in red, blue and green region when excited by UV light. A sheet of micro-lens is assembled between the light guide and the LCD to have the etched pixels in substantial alignment with the pixels of LCD and the lenses of the sheet of micro-lens. Thus red, blue and green pixels of light from the light guide passes through the intended red, blue and green pixels of LCD that has no traditional color filters, resulting in color pixel backlighting that enhances the optical efficiency of LCD.

18 Claims, 5 Drawing Sheets

UV BASED COLOR PIXEL BACKLIGHT FOR LIQUID CRYSTAL DISPLAY

BENEFIT OF PRIOR PROVISIONAL APPLICATION

Benefit of Provisional application No. 60/995,093 filed Sep. 24, 2007

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of Invention

This invention belongs to the area of flat panel display and more specifically to the backlight technology for Liquid Crystal Display (LCD).

LCD does not emit light and hence requires a backlight for its function as a visual display. Backlights based on Cold Cathode Fluorescent lamps (CCFLs) have been employed for backlighting LCDs. Recently Light Emitting Diodes (LEDs) have been employed as light sources for backlighting LCDs. White LEDs are predominantly used in cell phones and digital cameras and recently in lap top computers for backlighting LCDs. Red, Blue and Green LEDs are used in backlighting LCD TV. LCD requires a flat or sheet source of light at its rear side. As LEDs are point sources of light, there is a need to convert the point source of light in to a sheet source of light. This conversion is done through two configurations namely, edge-lit configuration and direct-lit configuration. In an edge-lit configuration, the LEDs are assembled at the edges of a rectangular light guide, usually a polycarbonate slab, and the light from LEDs undergo total internal reflections at the inner surface of light guide and finally get extracted through top surface of light guide facing the back surface of LCD. In the direct-lit configuration, LEDs are assembled inside a box and a diffuser sheet is assembled over the LEDs. Light from LEDs get mixed inside the box and further mixed in the diffuser sheet and finally emanates from the diffuser sheet towards LCD.

Thus a sheet source of light, usually white light, is generated and provided as backlight for LCD. The white light from LEDs contains all three primary colors and the colors are further filtered by color filters incorporated inside LCD for generating good quality of color pictures. It is well known that the color filters absorb 70-80% of incoming light and hence the LCD becomes optically less efficient. This remains a challenge.

2. Description of Prior Art

Prior art deals with the elimination of color filters inside LCD and provision of three primary colors of good purity that requires no filtering by the color filters. For example in one prior art (U.S. Pat. No. 4,978,888), Anandan et.al describes the use of flat fluorescent lamp incorporating red, blue and green color phosphors in the form of pixels, for backlighting color filter-less LCD. Red, blue and green color light from the pixilated surface of the flat fluorescent lamp provides individual primary colors of light to the pixels of LCD that does not incorporate color filters. Hence the use of the term 'color pixel backlighting'. The drawback in this prior art is the high ignition voltage in the range of thousands of volts and running voltage in the range of hundreds of volts in addition to thick and massive glass plates employed for the flat light source.

In another prior art (M. J. J. Jack et.al—"Color Separating backlight for improved LCD efficiency", pp. 175-178, Proceedings of 27$^{th}$ International Display Research Conference, 18-20 Sep. 2007, Moscow, Russia; Yoichi Taira et.al, "Low power LCD using a novel optical system", SID-02 Digest, pp. 1313-1315, 2002; Jyrki Kimmel et.al, "Diffractive backlight grating array for mobile displays", Proceedings of IDRC 2007, pp. 171-174, Moscow, September 2007) the authors describe the use of diffraction grating over the light guide to separate the three primary colors from the white light and employ a sheet of micro-lenses. The diffraction grating-separated three primary colors go through the LCD that has no color filters. The drawback in this prior art is the 'color crosstalk'. That is, light of one color passes through the unintended pixel of LCD where a different colored light is incident. It is clear from the prior art that providing a simple solution for 'color pixel backlighting' for a color filter-less LCD is a challenge.

In yet another prior art (U.S. Pat. No. 7,036,946 B1) Donald E. Mosier describes LCD backlight employing UV LEDs. In this invention, UV light from LEDs is coupled to a light guide and the UV light is made to fall on phosphor coated on the surface of light guide to emit visible light towards the LCD. This invention is completely devoid of the concept of 'color pixel backlighting' and does not deal with LCD without color filters.

A lower wavelength of light when incident on materials like phosphor results in the generation of higher wavelength of light. This is a basic science and known phenomena that is employed in fluorescent lamp for the past 40 years. Another example of lower wavelength light exciting a phosphor is the blue light from LED exciting yellow phosphor coated on the LED chip. This is commonly found in all the white LEDs employed in cell phone backlighting. This basic science is well known. What is not obvious is the innovative ways in which this basic science is exploited to invent new devices. U.S. Pat. No. 7,036,946 B1 by Donald E. Mosier exploits this basic science in inventing a light guide using UV light from LEDs. This invention does not contemplate about the backlighting of color filter-less LCD through the concept of 'color pixel backlighting'. By reading U.S. Pat. No. 7,036,946 B1, it will not be obvious to a person of ordinary skill to envision the concept of color pixel backlighting and exploit the basic science of lower wavelength light exciting a phosphor to invent a light guide that can backlight a color filter-less LCD. The present invention described in the subsequent paragraphs will not fall under the category of 'obviousness'.

In a research paper (N. Ogawa et.al—"Filed sequential color, LCD using organic EL backlighting"—SID Digest of Technical Papers SID International Symposium 1999), N. Ogawa et.al describe organic based electroluminescent backlight that is backlighting an LCD without color filters. This art is based on the field sequential operation of LCD wherein each frame of LCD driving consists of only one color. For example the backlight will provide a sheet of red light to the LCD 60 times per second and the LCD will select red pixels during this period. The next will be green sheet of light from backlight for 60 times a second followed by blue sheet of light. In other words the backlight will provide continuous sheet of light with a frame rate of 60 Hz for each color. This takes place sequentially for each color during which time the desired color pixels will be selected on LCD to generate color images. In this art, there is no 'color pixel backlighting' that takes place continuously. This is totally a different mode of operation and the sequential flashing of color sheet of light on LCD results in Psycho-physical effect that makes display exhibit 'color break-up', a defect that is still to be solved to make any commercial product.

In all the foregoing inventions, it is clear that either the concept of 'color pixel backlighting' is absent or, if present, it has problems for practical implementation and thus there is no simple solution for the challenge posed by 'color pixel backlighting' of color filter-less LCD. The present invention provides a simple solution to the challenge posed by 'color pixel backlighting'.

BRIEF SUMMARY OF THE INVENTION

According to the present invention, a planar UV light guide employing UV LEDs or near UV LEDs as light sources is described. This unique and innovative light guide provides pixelated three primary colors of lights for backlighting LCD that has no color filters. Both edge-lit and direct-lit light guides are described. The UV light is injected in to the UV light guide and the UV undergoes total internal reflections inside the light guide. The UV light is extracted through extracting features etched on the surface of light guide that faces the LCD. The UV extraction features are coated with red blue and green color phosphors. When the extracted UV falls on the phosphors, corresponding colors of light is generated. The etched features or pattern can be in the form of pixels or stripes. When the light guide is aligned to LCD with its etched features and a coupling micro-lens sheet in between, the pixels of LCD are backlit or illuminated with individual colored lights. Red light from etched pattern of the light guide will fall on the pixel of LCD that is intended to generate red pixels for the image. A similar phenomenon takes place for blue and green colors. Thus the color filter-less LCD obtains its intended colored backlight in the form of color pixels of light.

It is an object of this invention to provide color pixel backlighting for a color filter-less LCD using planar UV light guide that accepts and converts UV light in to visible light, to enable the LCD to have high luminous efficiency.

A further object of this invention is to provide visible color pixel backlighting for a color filter-less LCD through a planar UV light guide whose edges are assembled with UV or near UV LEDs that inject UV light in to the light guide in the edge-lit configuration.

Yet another object of this invention is to provide color pixel backlighting for a color filter-less LCD through a planar UV light guide in the form of a box which contains UV or near UV LEDs assembled in the direct-lit configuration.

Yet another object of this invention is to provide pixelated or striped visible color backlighting through planar UV light guide.

BRIEF DESCRIPTION OF DRAWINGS

FIG. 5b is a cross sectional view of one pixel taken from FIG. 5a.

DETAILED DESCRIPTION OF DRAWINGS

Figure 1:
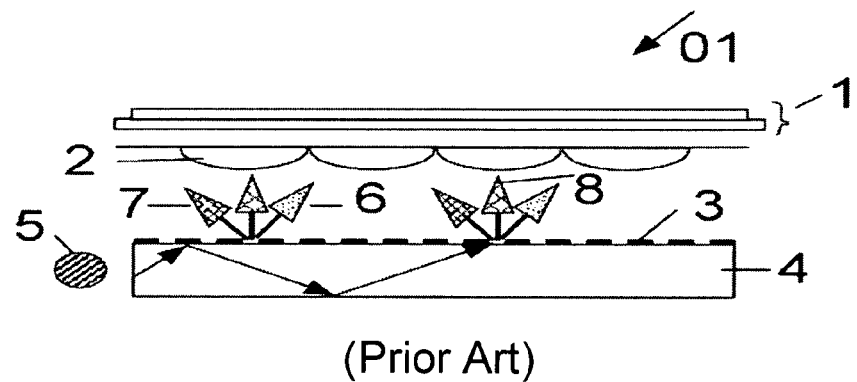
FIG. 1 is a cross-section of color pixel backlight using optical grating, according to one prior art.

FIG. 1 shows the cross-section of a color pixel backlight using optical grating, according to one prior art. The light guide 4 is edge-lit by a white light source 5 and the light rays from 5 enter the light guide and undergoes total internal reflections inside the light guide. A diffraction grating 3 placed on the light guide 4 diffracts the incident white light rays in to three different colors, blue 6, red 7 and green 8. These three color rays of light are focused by a sheet of micro-lens 2 on to the three color, pixels of LCD 1 that has no traditional color filters. The problem with this prior art is that part of red color get in to the adjacent lens that is meant to focus blue color. Hence there is a color cross-talk which is a serious issue for color images because it spoils the color purity. This is a challenging problem that exists for the past ten years.

Figure 2:
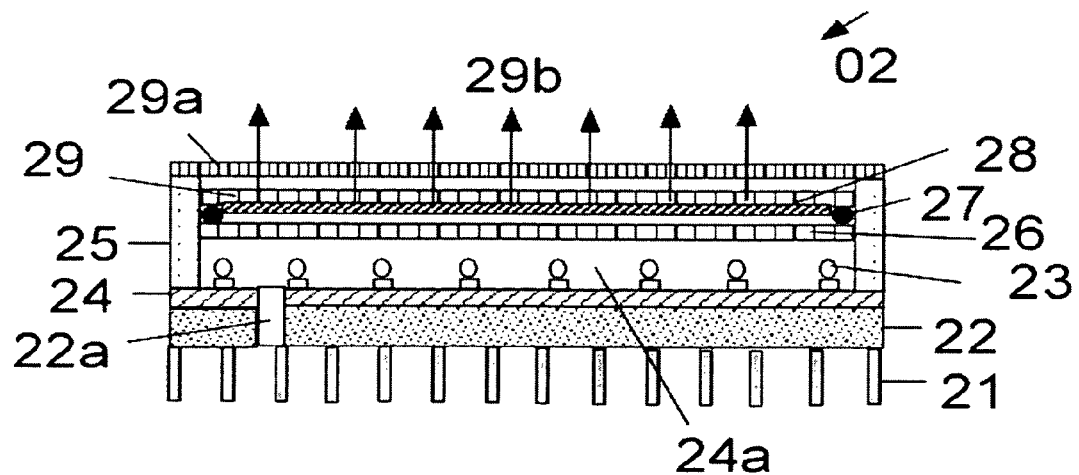
FIG. 2 is a cross-section of a direct-lit backlight employing UV Light guide, according to another prior art.

FIG. 2 is a cross-section of a direct-lit backlight employing UV Light guide, according to another prior art. The UV based backlight 02 comprises multiplicity of UV LEDs 23 mounted on printed circuit board 24 which is attached to a heat sink 22 that takes away the heat generated by UV LEDs 23. To the heat sink 22 is attached, cooling fins 21, which further dissipates heat, generated by the UV LEDs. A UV blocking wall 25 hermetically seals the whole assembly necessitating a pressure relief-hole 22a to be provided through the printed circuit board 24 and heat sink 22. A UV transparent plate 26, made of material like quartz, transmits UV rays (not shown in FIG. 2) from LEDs and the UV rays (not shown in FIG. 2) fall on a phosphor layer 28 deposited on a glass plate 29. The layer of phosphor consists of a mixture of red, green and blue phosphors. The plates 29 and 26 are sealed through a seal 27 to keep the moisture away from the phosphor. Excitation of phosphor by UV results in visible light 29b which travels towards the back of LCD (not shown) that has traditional color filters. A final UV blocking plate 29a sealed to the whole assembly prevents any residual UV reaching the back of the LCD. It is evident from this prior art that the backlight provided to the back of the LCD is a blanket sheet of white light from the phosphor 28. This prior art does not provide color-pixelated backlight to the LCD.

Figure 3:
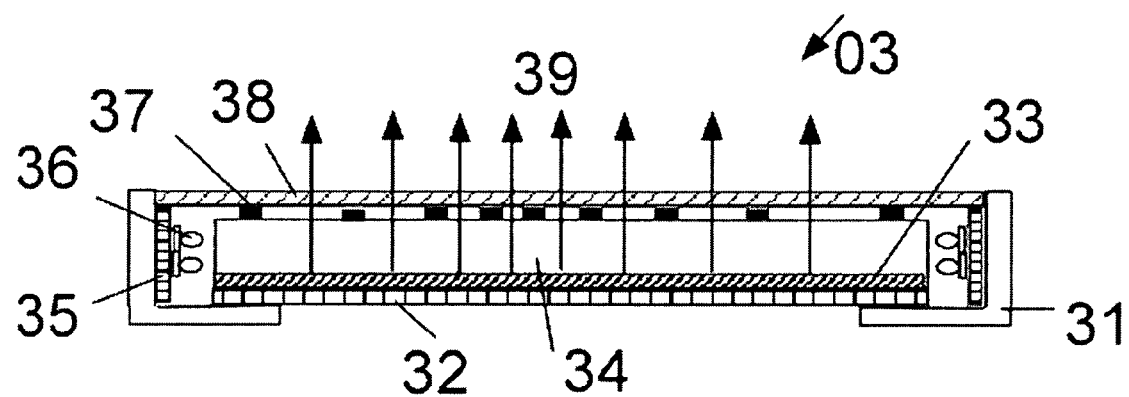
FIG. 3 is a cross sectional view of edge-lit backlight employing UV light guide according to prior art.

FIG. 3 is the cross section of another prior art showing the edge-lit backlight 03 employing UV LEDs 36. A light guide 34 made of UV transmitting material like quartz is coated with a tri-color phosphor 33 at the bottom surface followed by a sealant layer 32 that protects phosphor from ambient moisture. A heat sink 31 contacting a printed circuit board 35 conducts the heat, generated by UV LEDs to the ambient. The UV rays (not shown in FIG. 3) from UV LEDs travel inside the light guide 34 through total internal reflections and fall on phosphor layer 33 as well as on light extraction features 37 which are made of paint. The UV rays falling on phosphor excites the phosphor and the visible light output 39 escapes the light guide vertically up towards the LCD that contains traditional color filters. The UV rays falling on the interface between light extraction features 37 and the light guide undergo both reflection and scattering through the light extraction, features. The UV rays also excite the paint material resulting in visible light output. The extraction feature 37 either in the form of stripes or dots is deposited dense at the center and less dense away from the center to generate uniformity of light leaving the light guide towards the LCD. A UV blocking layer 38 prevents any residual UV reaching the back of LCD (not shown). It is clear that this prior art can not provide color-pixelated backlight for LCD.

Figure 4:
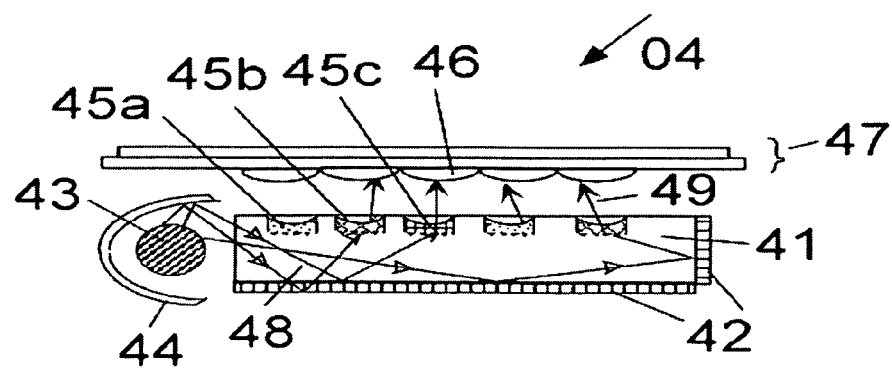
FIG. 4 is a cross sectional view of one embodiment of the present invention

FIG. 4 is the cross section of an edge-lit light guide 04, according to one embodiments of the present invention, employing Near UV (NUV) LEDs 43 assembled at one edge of the light guide 41 perpendicular to the plane of the paper. The material of the light guide should be transmitting UV and can be either made of quartz or silicate glass. A UV reflecting mirror 44, for example made of a thin film of Aluminum with Magnesium Fluoride over coating, gathers UV rays escaping to the back side of NUV LED and directs the UV rays in to the light guide 41. UV mirrors 42 perform similar job of directing the UV rays inside the light guide. The UV rays undergo total internal reflection 48 inside the light guide and when they strike the etched portions 45a, 45b, and 45c that contain red, blue and green phosphors respectively over-coated with a protective layer (not shown in FIG. 4 but shown in FIG. 5 and FIG. 6), visible light output 49 results. The visible rays pass through a sheet of micro lens 46 that is laminated to the back of LCD 47 that does not contain traditional color filters. The etched portions 45a, 45b and 45c containing red, blue and green phosphor respectively are aligned to the sheet of micro lens 46 which in turn is aligned to every pixel of LCD 47. Each etched portion gives out visible color light depending on the color of phosphor it contains. The alignment is such that the intended red pixel of LCD is aligned with the etched portion that contains phosphor that emits red light. In a similar way the other colors are automatically aligned with the matching of the pitch of the etched portions and the pitch of the pixels of LCD. Thus the present invention provides backlight to every pixel their corresponding color of light. Prior arts employing UV light guide do not teach this and is not obvious for one skilled in the art. Even with a combination of prior inventions, it will not be obvious for a person of ordinary skill to arrive at the present invention.

Figure 5A:
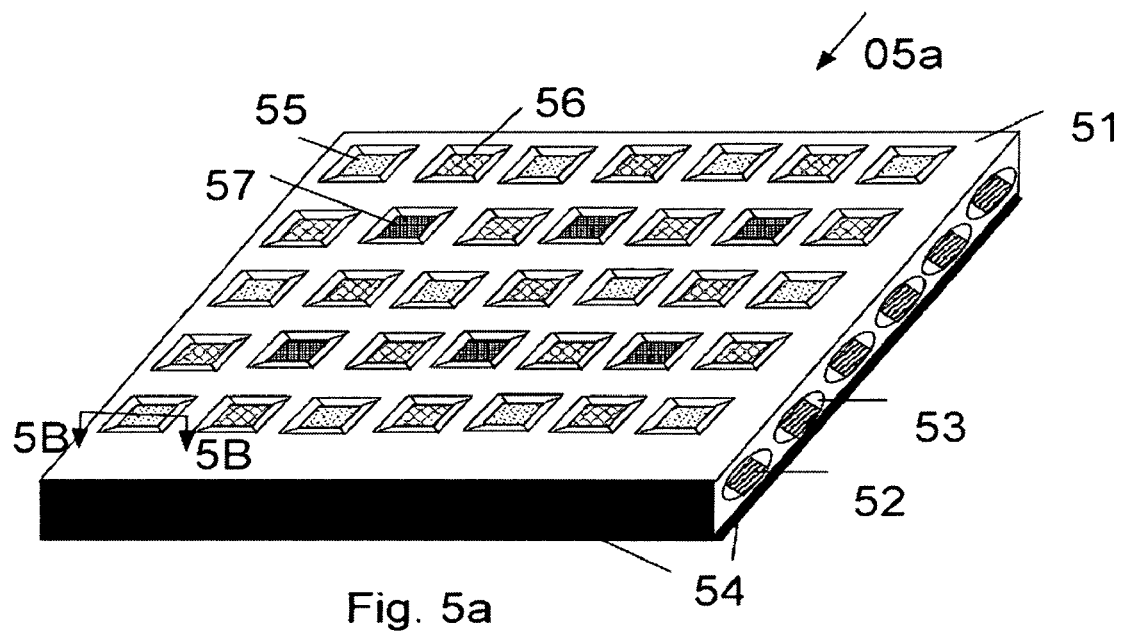
FIG. 5a is an isometric view of the embodiment shown in FIG. 4.
Figure 5B:
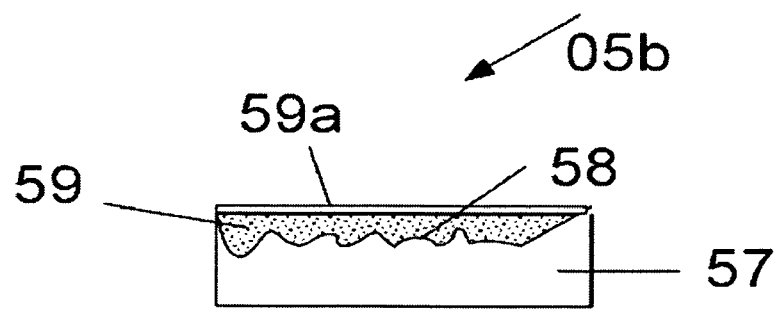
Figure 6:
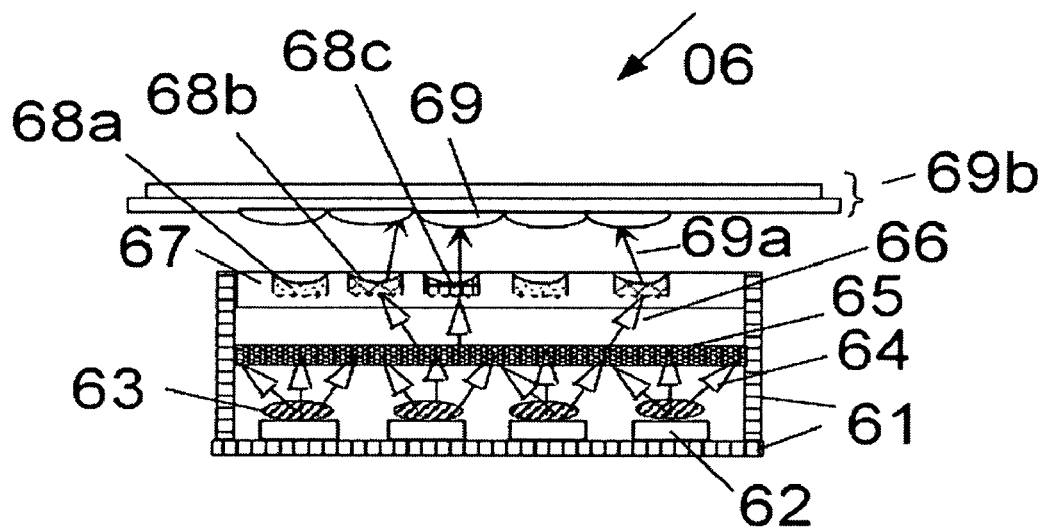
FIG. 6 is a cross section of another embodiment of the present invention.

FIG. 5 is an isometric view 05a of the edge-lit system shown in FIG. 4. NUV LEDs 52, with reflectors 53 over them, are assembled at one edge of UV transmitting light guide 51. The other three edges of the light guide and the bottom surface of the light guide 51 are coated with UV reflector 54 to prevent leakage of UV rays. The etched structures 55, 56 and 57 on top of the light guide are shown to resemble a square pixel. These can be rectangular shape as well. A cross section 05b of the etched feature 5B-5B is shown in FIG. 5b. The top surface of the light guide 57 is etched through chemical etching or sand-blasted to obtain a rough surface 58 so as to extract UV rays from inside the UV light guide 57. The rough surface is coated with a particular color phosphor 59. The UV rays (not shown in FIG. 5a and FIG. 5b) extracted locally from the top surface of the light guide at the portions of the rough surface 58 are incident on the phosphor coated over the surface and produce visible light. If the material of the phosphor, for example is $Y_2O_3$:Eu, then a red color visible light is generated throughout area of phosphor. If the material of the phosphor is $LaPO_4$:Ce,Tb, then a green color of visible light is generated throughout area of phosphor and in the same manner if the material of phosphor is $BaMg_2Al_{16}O_{27}$:Eu, then a blue color of visible light is generated throughout area of phosphor. Thus pixels of colored light are generated locally on the surface of the light guide. For example, in the FIG. 5a, etched feature 55 can generate red color and 56 can generate green color and 57 can generate blue color. The etched features can also be in the form of stripes generating red stripe of colored light, green strip of colored light and blue stripe of colored light. FIG. 5b shows a protective layer 59a for the phosphor for preventing moisture and other contaminants entering the phosphor. The phosphor layer can also consist of coated particle of phosphor in that every particle of phosphor is coated with a protective layer FIG. 6 is a cross section 06 of another embodiment of the present invention. NUV LEDs 63 with their individual mounting structure 62 is assembled on a printed circuit board with heat sinking structures (not shown in FIG. 6). All the LEDs are contained in a UV reflector box 61. UV rays 64 from the LEDs fall on a UV diffuser sheet 65 that scatters and mixes the UV rays from individual NUV LEDs 63 and a uniform UV flux emanates from the UV diffuser sheet 65. The NUV rays 66 from the UV diffuser sheet enters the UV light guide plate 67 that contains etched red phosphor pixel 68a, blue phosphor pixel 68b and green phosphor pixel 68c. The detailed cross-section of red, blue and green pixels is shown already in FIG. 5b. The visible blue ray 69a, for example from the blue pixel fall on a micro-lens sheet 69 that is aligned to the corresponding LCD pixels of blue (not shown in FIG. 6). The LCD 69b does not contain the traditional color filters. In a similar manner the other two colors are also aligned automatically if the pitch of etched pixel matches closely the pitch of the LCD. In this embodiment, NUV LEDs 63 are assembled behind the light guide 67 and the NUV rays from LEDs 63 fall on the light guide in a direction perpendicular to the surface of the light guide. This configuration is termed as 'direct-lit' mode.

Figure 7:
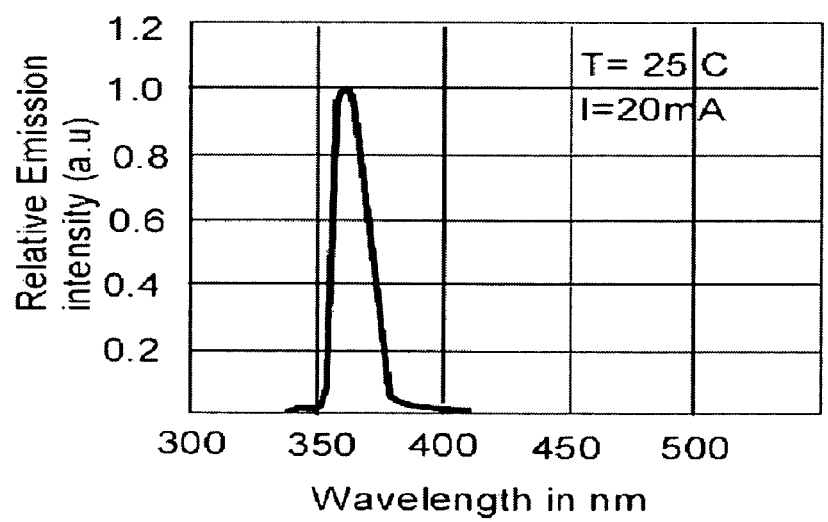
FIG. 7 is the NUV spectrum emitted by NUV LED.

FIG. 7 shows the NUV spectrum emitted by NUV LEDs. For a forward current of 20 mA and at 25 C the spectrum emitted by NUV LEDs has peak wavelength of 360 nm.

Figure 8:
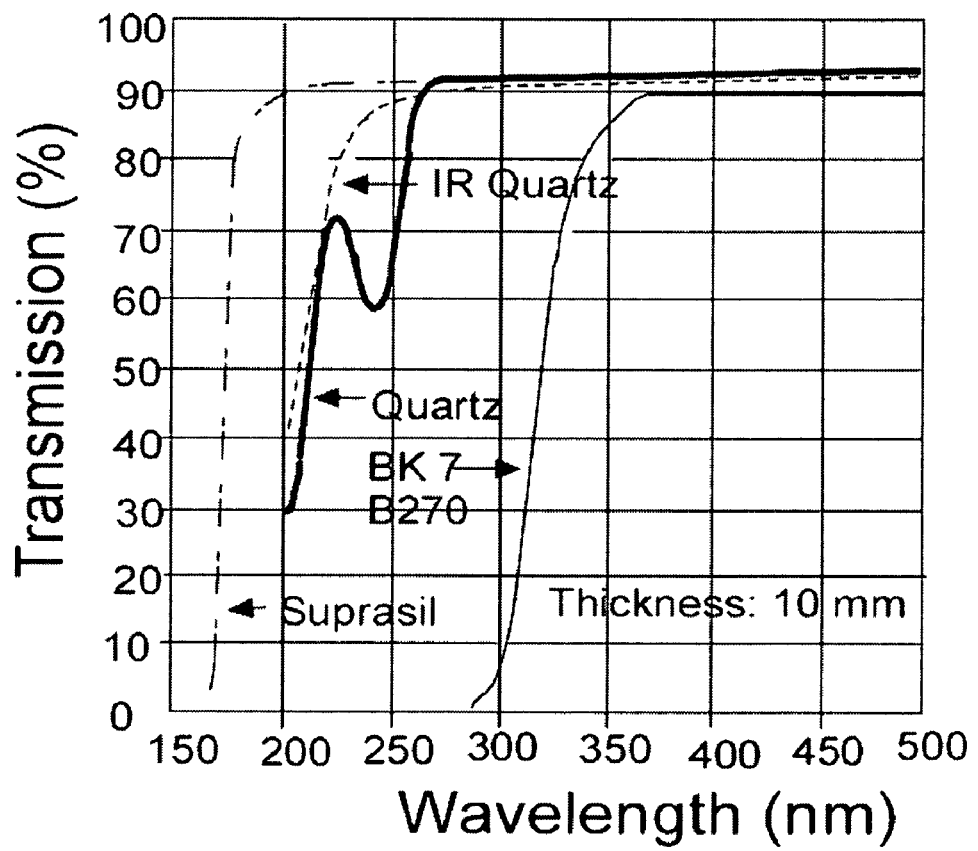
FIG. 8 illustrates the transmission of UV by various materials that can be used to make the UV light guide.

FIG. 8 illustrates the transmission characteristics of various materials that can be used to make UV light guide. Borosilicate glasses like BK7 and B270 and quartz glasses have transmission of 90% or greater at wavelengths of 360 nm and above.

It will be understood that one skilled in the art could modify the above basic design, geometries, sequence of assemblies, materials and components. Various modifications and variations can be made in the construction, configuration and/or operation of the present invention without departing from the scope or spirit of the invention. By way of examples, (i) the description of phosphor in the illustrations is generally about red, blue and green phosphor but this can be altered to specific compositions for red, blue and green phosphors as well as the addition of a white pixel of phosphor (ii) the NUV LEDs described are those whose peak wavelength is in the neighborhood of 360 nm but this can be altered to have peak wavelength less than 360 nm and more than 360 nm (iii) the backlight box in 'direct-lit' configuration shows the UV reflectors, UV diffusers and heat sink but this can be modified to include many additional UV optical elements to obtain more uniform UV rays that can strike the phosphor to obtain uniform colored visible light (iv) the light guide structures described are provided with basic reflectors but this can be modified to have reflector patterns and multi-layer coatings of reflectors (vi) the coupling element described to couple light from color phosphors to LCD with good alignment is a sheet of micro-lens but this can be modified to include other optical elements such as prism sheet (vii) the light guide described with one edge assembled with NUV LEDs but this can be modified to have NUV LEDs assembled on two edges or three edges or four edges of light guide. Thus it is intended that the present invention covers the modifications and variations of the invention provided they come within the scope of the appended claims and their equivalents.

I claim:

1. An ultra-violet based color-pixel backlight system for Liquid Crystal Display, without color filters, comprising:
    a light guide, having four edges and two broad surfaces, with its one edge transmitting UV rays and assembled with a multiplicity of UV emitting LEDs and the other three edges, opposite to and adjacent to the transmitting edge reflecting UV rays with its bottom surface coated with UV reflecting mirror and its top surface etched with pixelated square patterns for extracting UV light from the light guide;
    means for connecting UV LEDs to electrical power to emit UV radiation;
    said etched square patterns containing phosphor layers with a protective coating on top of the phosphor layers;
    said phosphor layers containing red, blue and green phosphors that convert the UV rays incident on them in to visible red, blue and green colors of light, with pixel patterns, that travels towards a sheet of micro-lens;
    said sheet of micro-lens, said etched pattern on the surface of the light guide and the LCD assembled such that the said sheet of micro-lens, said etched pattern on the surface of the light guide and the LCD are kept substantially in alignment to provide color-pixel backlighting to the LCD.

2. An ultra-violet based color-pixel backlight system for Liquid Crystal Display, without color filters, as claimed in claim 1 wherein the said UV emitting LEDs emit UV rays with peak wavelengths in the range of 150 nm to 400 nm.

3. An ultra-violet based color- pixel backlight system for Liquid Crystal Display, without color filters, as claimed in claim 2 wherein the said UV emitting LEDs comprising different groups of LEDs emitting UV rays with peak wavelengths with spread in values within the range of 150 nm to 400 nm.

4. An ultra-violet based color-pixel backlight system for Liquid Crystal Display, without color filters, as claimed in claim 1 wherein the said light guide is made of UV transmitting quartz glass or borosilicate glass.

5. An ultra-violet based color-pixel backlight system for Liquid Crystal Display, without color filters, as claimed in claim 1 wherein the said etched patterns on the said light guide are in the form of squares or rectangles or triangles or stripes.

6. An ultra-violet based color-pixel backlight system for Liquid Crystal Display, without color filters, as claimed in claim 1 wherein the said phosphor layers are coated with a thin transparent protective layer comprising one of the thin oxides of Si or Al or Ti or Zn or Mg or combinations of these oxides.

7. An ultra-violet based color-pixel backlight system for Liquid Crystal Display, without color filters, as claimed in claim 1 wherein the said phosphor layers comprise individual phosphor particles coated with moisture resistant protective layer.

8. An ultra-violet based color-pixel backlight system for Liquid Crystal Display, without color filters, as claimed in claim 7 wherein the said moisture resistant protective layer coated over the individual particles of phosphor layers comprises any one of the thin oxides of Si or Al or Ti or Zn or Mg or combinations of these oxides.

9. An ultra-violet based color-pixel backlight system for Liquid Crystal Display, without color filters, as claimed in claim 1 wherein the said UV reflecting mirror is of thin Aluminum film coated with a thin film of Magnesium Fluoride.

10. An ultra-violet based color-pixel backlight system for Liquid Crystal Display, without color filters, comprising:
    a light box having five surfaces with all the five surfaces being provided with UV reflectors with bottom surface containing multiplicity of UV emitting LEDs integrated to heat dissipating structures;
    means for connecting UV LEDs to electrical power to emit UV radiation;
    said light box containing a UV diffuser plate above the said UV LEDs and diffusively and uniformly transmitting UV rays towards a UV transmitting plate;
    said UV transmitting plate having its top surface etched to create pixelated square patterns for extracting UV rays and the remaining areas coated with UV reflecting layer;
    said etched square patterns containing phosphor layers with a protective coating on top of the phosphor layers;
    said phosphor layers containing red, blue and green phosphors that convert the UV rays incident on them in to visible red, blue and green colors of light, with pixel patterns, that travels towards a sheet of micro-lens;
    said sheet of micro-lens, said etched pattern on the surface of the said UV transmitting plate and the LCD assembled such that the said sheet of micro-lens, said etched pattern on the surface of the said UV transmitting plate and the LCD are kept substantially in alignment to provide color-pixel backlighting to the LCD.

11. An ultra-violet based color-pixel backlight system for Liquid Crystal Display, without color filters, as claimed in claim 10 wherein the said backlight box has side walls and bottom surface coated with UV reflectors made of Aluminum film coated with a thin film of Magnesium Fluoride.

12. An ultra-violet based color-pixel backlight system for Liquid Crystal Display, without color filters, as claimed in claim 10 wherein the said UV emitting LEDs emit UV rays with peak wavelengths in the range of 150 m to 400 nm.

13. An ultra-violet based color-pixel backlight system for Liquid Crystal Display, without color filters, as claimed in claim 12 wherein the said UV emitting LEDs comprising different groups of LEDs emitting UV rays with peak wavelengths with spread in values within the range of 150 nm to 400 nm.

14. An ultra-violet based color-pixel backlight system for Liquid Crystal Display, without color filters, as claimed in claim 10 wherein the said UV transmitting plate is made of UV transmitting quartz glass or borosilicate glass.

15. An ultra-violet based color-pixel backlight system for Liquid Crystal Display, without color filters, as claimed in claim 10 wherein the said etched patterns on the said UV transmitting plate are in the form of squares or rectangles or triangles or stripes.

16. An ultra-violet based color-pixel backlight system for Liquid Crystal Display, without color filters, as claimed in claim 10 wherein the said phosphor layers are coated with a thin transparent protective layer comprising one of the thin oxides of Si or Al or Ti or Zn or Mg or combinations of these oxides.

17. An ultra-violet based color-pixel backlight system for Liquid Crystal Display, without color filters, as claimed in claim 10 wherein the said phosphor layers comprise individual particles of phosphor coated with moisture resistant protective layer.

18. An ultra-violet based color-pixel backlight system for Liquid Crystal Display, without color filters, as claimed in claim 17 wherein the said moisture resistant protective layer over the individual particles of phosphor comprises any one of the thin oxides of Si, Al, Ti, Zn and Mg.

* * * * *